(12) United States Patent
Nakatani et al.

(10) Patent No.: US 7,792,002 B2
(45) Date of Patent: Sep. 7, 2010

(54) OPTICAL DISC DEVICE

(75) Inventors: Morio Nakatani, Ichinomiya (JP);
Masahiro Nakata, Ogaki (JP); Noboru Mamiya, Hodumi Mizuho (JP)

(73) Assignee: Sanyo Electric Co., Ltd., Osaka (JP)

( * ) Notice: Subject to any disclaimer, the term of this patent is extended or adjusted under 35 U.S.C. 154(b) by 1107 days.

(21) Appl. No.: 11/475,175

(22) Filed: Jun. 27, 2006

(65) Prior Publication Data

US 2007/0002713 A1    Jan. 4, 2007

(30) Foreign Application Priority Data

Jun. 30, 2005    (JP) .............................. 2005-192181

(51) Int. Cl.
*G11B 3/74*    (2006.01)
(52) U.S. Cl. ...................... 369/94; 369/53.37; 386/125; 386/126
(58) Field of Classification Search .............. 369/53.45, 369/94, 275.1; 386/125, 126
See application file for complete search history.

(56) References Cited

U.S. PATENT DOCUMENTS

| 7,151,729 | B1 * | 12/2006 | Park et al. ................... 369/53.2 |
| 7,587,126 | B2 * | 9/2009 | Okamoto et al. .............. 386/94 |
| 2007/0025221 | A1 * | 2/2007 | Nakatani et al. ......... 369/53.45 |
| 2008/0259759 | A1 * | 10/2008 | Martens et al. ............... 369/94 |
| 2008/0260161 | A1 * | 10/2008 | Yokota et al. ............... 380/278 |
| 2009/0262623 | A1 * | 10/2009 | Leblanc et al. ................ 369/94 |

FOREIGN PATENT DOCUMENTS

| JP | 11-311983 | 11/1999 |
| JP | 2000-173162 | 6/2000 |
| JP | 2003-230087 | 8/2003 |

(Continued)

OTHER PUBLICATIONS

Japanese Decision of Final Rejection, with English Translation, issued in Japanese Patent Application No. JP 2005-192181, dated Feb. 10, 2009.
Japanese Notification of Reasons for Refusal, with English Translation, issued in Japanese Patent Application No. JP 2005-192181, mailed on Mar. 4, 2008.
Japanese Office Action, with English translation, issued in Japanese Patent Application No. JP 2005-192181, mailed Oct. 7, 2008.

*Primary Examiner*—Wayne R Young
*Assistant Examiner*—Brenda Bernard
(74) *Attorney, Agent, or Firm*—McDermott Will & Emery LLP

(57) ABSTRACT

When a disc loaded on a player is a hybrid next generation DVD, determination is made on whether the connected TV device is adaptable for the HD mode. Such determination is performed by whether or not the copyright protecting function of the connected TV device satisfies a condition set in advance. When adaptable for the HD mode, reproduction prioritizing the HDDVD layer is performed. When not adaptable for the HD mode, reproduction prioritizing the DVD layer is performed. Thus, the video content of HD mode recorded on the HDDVD layer is protected against leakage to the outside via the connected TV device by reproducing the DVD layer in preference in the case the copyright protecting function of the TV device is not sufficient.

20 Claims, 10 Drawing Sheets

FOREIGN PATENT DOCUMENTS

| | | |
|---|---|---|
| JP | 2003-346348 A | 12/2003 |
| JP | 2004-146016 | 5/2004 |
| JP | 2005-101865 | 4/2005 |
| JP | 2005-110248 | 4/2005 |
| WO | WO 2004/044908 A1 | 5/2004 |
| WO | WO 2006/080350 A1 | 8/2006 |

* cited by examiner

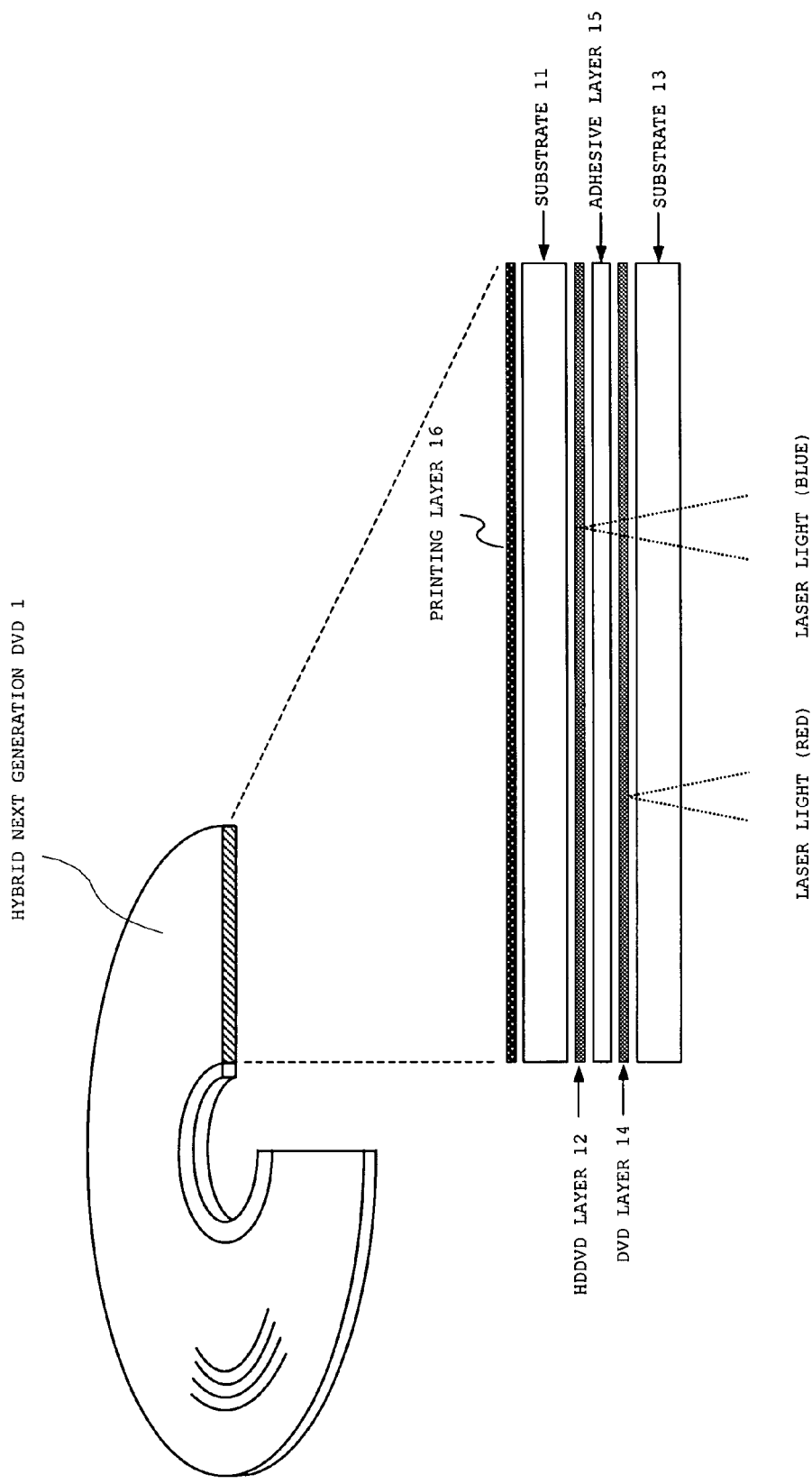

CASE OF MULTI-LAYER DISC

CASE OF HYBRID NEXT GENERATION DVD

OPTICAL DISC DEVICE

This application claims priority under 35 U.S.C. §119 of Japanese Patent Application No. 2005-192181 filed Jun. 30, 2005.

BACKGROUND OF THE INVENTION

1. Field of the Invention

The present invention relates to optical disc devices, and, in particular, to an optical disc device capable of reproducing a hybrid optical disc in which a DVD layer and a next generation DVD layer are arranged in a stacking direction.

2. Description of the Related Art

Presently, standardization of the next generation DVD (Digital Versatile Disc) using a blue laser light having a wavelength of 405 nm is being put forward. In such standardization, consideration is being made on arranging two recording layers, which are the recording layer (hereinafter referred to as "HDDVD layer") corresponding to the blue laser light and the recording layer (hereinafter referred to as "DVD layer") corresponding to the red laser light, in the stacking direction.

In the next generation DVD (hereinafter referred to as "hybrid next generation DVD"), it is assumed that a video content is recorded on the large capacity HDDVD layer in the high-definition (HD) mode, and the same content is recorded on the DVD layer in the standard (SD) mode. In such a case, particularly strict copyright protection is required for the video content of HD mode recorded on the HDDVD layer.

Japanese Laid-Open Patent Publication No. 2003-346348 described below discloses an optical disc with two recording layers and a drive unit for the same.

In the drive unit for reproducing the hybrid next generation DVD, consideration is made on which of the DVD layer and the HDDVD layer should be given the priority in reproduction over the other. Here, a method of giving the priority to and reproducing the HDDVD layer having a greater capacity may be used as one method.

However, this may pose a risk that, if the copyright protecting function of a monitor to which the device is connected is not sufficient, the video content of HD mode recorded on the HDDVD layer is illegally retrieved through the monitor. In a case where the connected monitor is not adaptable for the HD mode, the possibility of the video content of HD mode being exposed to illegal copy increases if the HDDVD layer is unnecessarily reproduced. Therefore, when the connected monitor is inadaptable for the HD mode, reproduction of the video content of HD mode is not necessary, and it is sufficient to reproduce the video content of SD mode of the same content recorded on the DVD layer.

SUMMARY OF THE INVENTION

The present invention aims to provide an optical disc device that solves the above problems, and that smoothly reproduces the HDDVD layer and the DVD layer, while achieving copyright protection of a video content of HD mode recorded on the HDDVD layer.

A first aspect of the present invention relates to an optical disc device capable of reproducing a hybrid optical disc in which a DVD layer and a next generation DVD layer are arranged in a stacking direction. The optical disc device includes: a determining means for determining a function of a monitor to which the optical disc device is connected; and a reproducing means for reproducing one of the DVD layer and the next generation DVD layer arranged in the hybrid optical disc in priority to the other layer based on the determination result of the determining means.

A second aspect of the present invention relates to the optical disc device in the first aspect, wherein the determining means determines whether the function of the connected monitor is adaptable for the reproduction of the next generation DVD layer, and when the function of the connected monitor is adaptable for the reproduction of the next generation DVD layer, the reproducing means executes a reproduction process to the next generation DVD layer in priority to the DVD layer.

A third aspect of the present invention relates to the optical disc device in the second aspect, wherein the determining means determines whether a copyright protecting function of the connected monitor satisfies a condition set in advance, and when the condition is satisfied, the reproducing means executes the reproduction process to the next generation DVD layer in priority to the DVD layer.

A fourth aspect of the present invention relates to the optical disc device in the third aspect, wherein, when the copyright protecting function of the connected monitor does not satisfy the condition, the reproducing means prohibits the reproduction process from running with respect to the next generation DVD layer.

A fifth aspect of the present invention relates to the optical disc device in the third aspect, wherein the determining means includes a means for acquiring, from the connected monitor, information for evaluating the copyright protecting function.

According to the optical disc device of the above aspects, one of the DVD layer and the next generation DVD layer is selectively set to be reproduced in priority over the other based on the function of the connected monitor. That is, the reproduction of the next generation DVD layer is prioritized when the copyright protecting function of the connected monitor satisfies the condition set in advance, and the reproduction of the DVD layer is prioritized when the condition is not satisfied. In addition, the reproduction of the next generation DVD layer may be prioritized when the function of the connected monitor is adaptable for the high-definition mode (HD mode), and the reproduction of the DVD layer may be prioritized when the function of the connected monitor is inadaptable for with the HD mode. Therefore, the possibility of the video content of HD mode recorded on the HDDVD layer leaking outside through the connected monitor may be effectively suppressed, and it is possible to reliably obtain the copyright protection of the relevant content.

In particular, as the reproduction process to the next generation DVD layer is prohibited when the copyright protecting function of the connected monitor does not satisfy the condition as in the fourth aspect, a reliable copyright protection may be achieved.

The processes in each means are mainly executed with the controller 106 in the embodiments described below.

BRIEF DESCRIPTION OF THE DRAWINGS

These and other objects, features and advantages according to the present invention may best be understood by reference to the following description of the presently preferred embodiments together with the accompanying drawings, in which:

FIG. 1 illustrates a configuration of a hybrid next generation DVD according to an embodiment of the present invention;

DETAILED DESCRIPTION OF THE PREFERRED EMBODIMENT

Figure 2A:
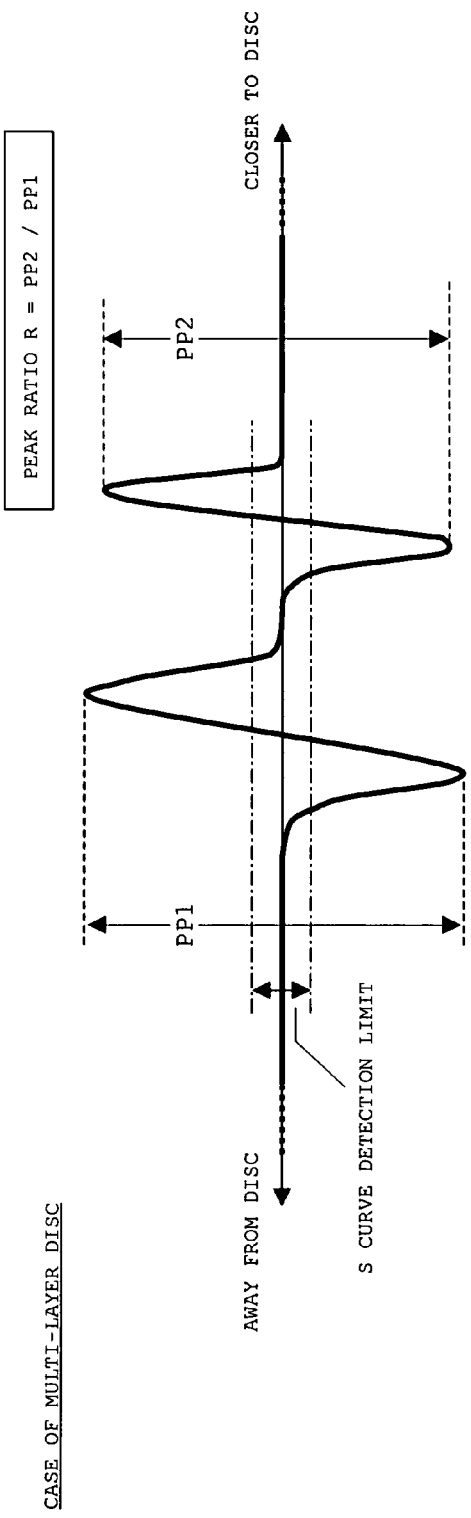
FIGS. 2A and 2B are views explaining an S curve of a focus error signal according to the embodiment of the present invention.

The embodiment of the present invention will now be described with reference to the drawings.

In the present embodiment, an optical disc device capable of compatibly reproducing both of a next generation DVD (single layer, HDDVD layer single sided multi-layer, HDDVD layer/DVD layer single sided hybrid) and a DVD (single layer, DVD layer single sided multi-layer) is illustrated.

FIG. 1 shows a configuration of the hybrid next generation DVD.

The hybrid next generation DVD 1 has a configuration in which a substrate 11 formed with a HDDVD layer 12 on one surface and a substrate 13 formed with a DVD layer 14 on one surface are laminated by an adhesive layer 15, and a printing layer 16 is formed on the other surface of the substrate 11. A laser light enters from the substrate 13 side. Helical tracks are formed on the HDDVD layer 12 and the DVD layer 14 in the recordable type. Pits are arrayed in helical shape in the reproduction only type.

The data format of the DVD layer 14 is the same as the data format of the existing DVD. Information indicating that the HDDVD layer 12 is present is not contained in lead-in information of the DVD layer 14. The DVD layer 14 transmits and reflects a blue laser light having a wavelength of about 405 nm and a red laser light having a wavelength of about 655 nm, respectively, at a defined ratio.

The data format complying with the next generation DVD standard is applied to the HDDVD layer 12. The information indicating that the DVD layer 14 is present is not either contained in the HDDVD layer 12 (this may be implemented in the future). The HDDVD layer 12 is formed by a material that reflects the blue laser light at a defined reflectance, but in which the reflectance for the red laser light is extremely low compared to that for the blue laser light.

The multi-layer type DVD in which two DVD layers are arranged on one surface has a configuration in which the HDDVD layer 12 is replaced by the DVD layer in the configuration of FIG. 1. In this case, the lead-in information of the DVD layer contains information indicating the presence of two DVD layers.

The multi-layer type next generation DVD in which two HDDVD layers are arranged on one surface has a configuration in which the HDDVD layer 12 is replaced by the DVD layer in the configuration of FIG. 1. In this case as well, the lead-in information of the HDDVD layer contains information indicating the presence of two HDDVD layers.

FIG. 2A is a schematic diagram showing S curves of the focus error signal of when the red laser light is irradiated on the DVD or the next generation DVD of multi-layer type having two DVD layers or two HDDVD layers on one surface and focus search is performed.

Figure 2B:
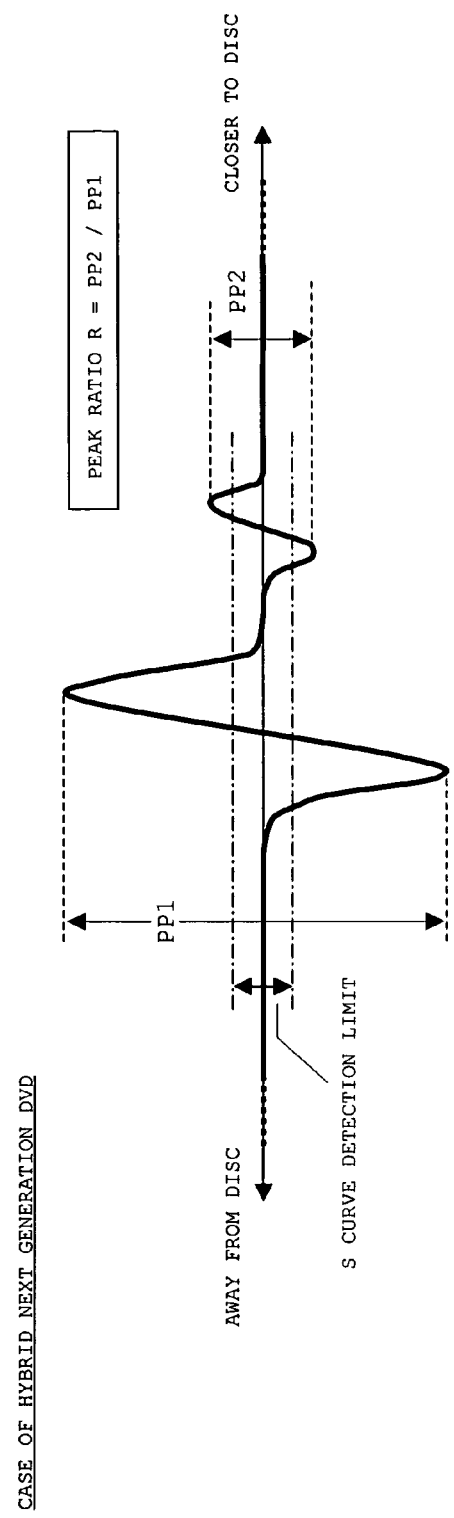

FIG. 2B is a schematic diagram showing the S curves of the focus error signal of when the red laser light is irradiated on the hybrid next generation DVD and focus search is performed.

When the red laser light is irradiated on the DVD or the next generation DVD of single layer type and focus search is performed, the S curve produced by the recording layer appears on the focus error signal. In this case, the S curve produced by the substrate surface also appears in addition to the S curve produced by the recording layer. However, since the peak interval of the S curve produced by the substrate surface is sufficiently small compared to the peak interval PP2 of FIG. 2B, false detection of recognizing the S curve produced by the substrate surface as the S curve produced by the recording layer can be avoided by appropriately setting a liming value for detecting the S curve produced by the recording layer.

Figure 3:
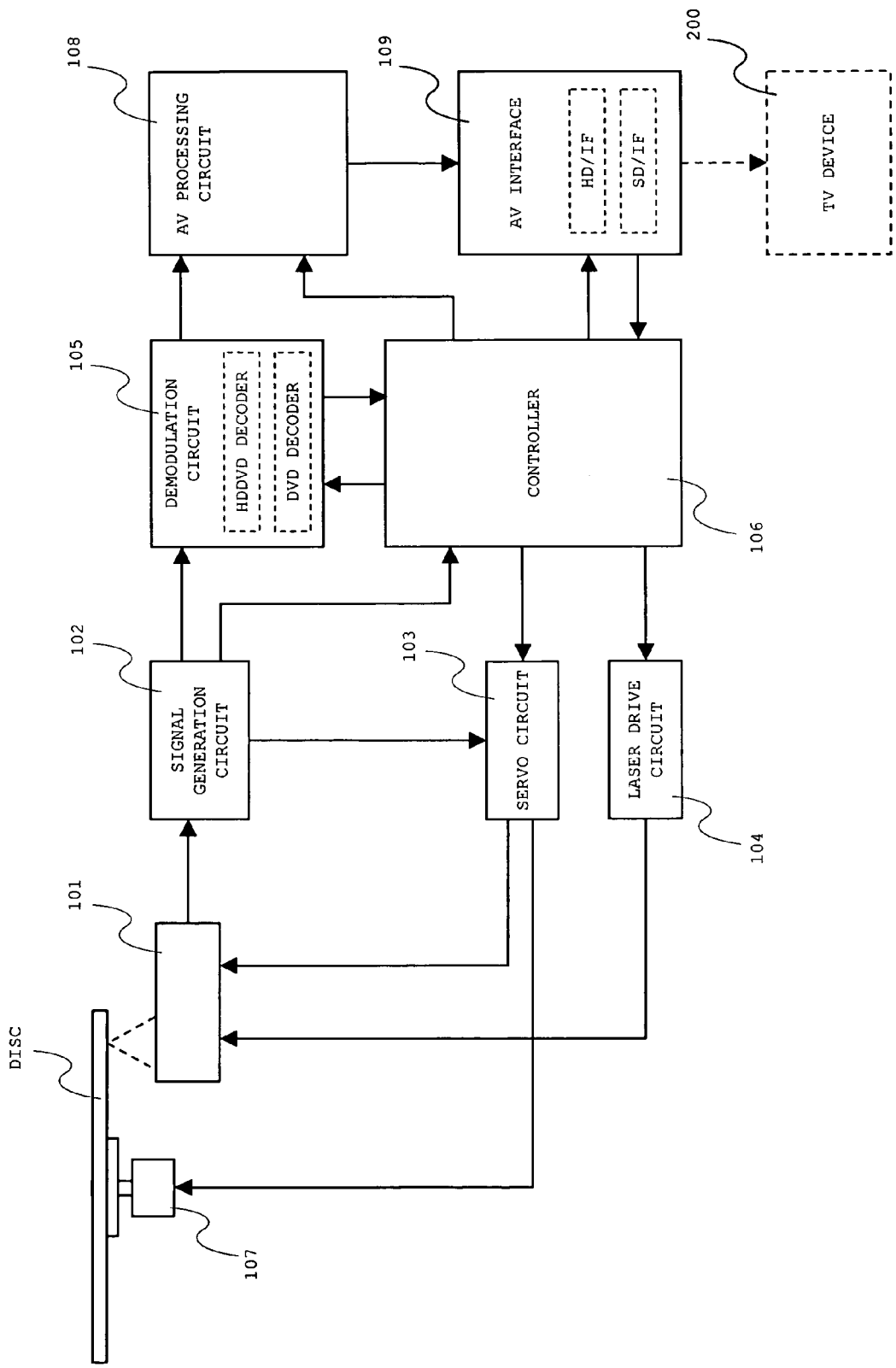
FIG. 3 illustrates a configuration of an optical disc device according to the embodiment of the present invention.

FIG. 3 shows a configuration of the optical disc device. In this figure, only the blocks associated with the reproduction system are shown.

The optical disc device includes an optical pick up 101, a signal generation circuit 102, a servo circuit 103, a laser drive circuit 104, a demodulation circuit 105, a controller 106, a spindle motor 107, an AV processing circuit 108, and an AV interface 109.

The optical pick up 101 includes a semiconductor laser for exiting the blue laser light having a wavelength of about 405 nm and a red laser light having a wavelength of about 655 nm. Further the pick up 101 includes an objective lens for converging the laser light onto the disc, an objective lens actuator for driving the objective lens in a focusing direction and a tracking direction, a photodetector for receiving the reflected light from the disc, and an optical system for guiding each laser light exited from the semiconductor laser to the objective lens and for guiding the reflected light from the disc to the photodetector.

The signal generation circuit 102 performs calculation process on the signal from the photodetector arranged in the optical pick up 101, generates various signals such as RF signal, focus error signal, tracking error signal and the like and outputs the signals to their corresponding circuits.

The servo circuit 103 generates a focus servo signal and a tracking servo signal based on the signal input from the signal generation circuit 102, and outputs such signals to the objective lens actuator of the optical pick up 101. The servo circuit 103 also generates a motor servo signal based on the signal input from the signal generation circuit 102 and outputs the motor servo signal to the spindle motor 107.

The laser drive circuit 104 outputs a drive signal to the semiconductor laser in the optical pick up 101 based on a control signal input from the controller 106. The light emissions of the blue laser light and the red laser light are appropriately switched according to such control.

The demodulation circuit 105 demodulates the RF signal input from the signal generation circuit 102, generates the reproducing data and outputs the data to the AV processing circuit 108. The demodulation circuit 105 includes a demodulating section (HDDVD decoder) for performing data demodulation according to the next generation DVD data format and a demodulating section (DVD decoder) for performing data demodulation according to the DVD data format. Which demodulating section to use is set based on the control signal from the controller 106. Whether or not demodulatable at each demodulating section and the sub-information such as lead-in information are output from the demodulation circuit 105 to the controller 106.

The controller 106 stores various data in a built-in memory, and controls each section according to the program set in advance. The controller 106 receives the focus error signal from the signal generation circuit 102 in the disc determining process. The controller 106 then performs disc determination based on the relevant signal.

Further the controller 106 inquires a monitor to which the device is connected (TV device 200) regarding a monitor specification via an AV interface 109, and determines the function of the TV device 200 based on the response. Specifically, determination is made on whether the TV device 200 is capable of displaying an image of HD mode, and whether the copyright protecting function of the connected monitor is sufficient. When the hybrid next generation DVD is loaded, selective setting is performed according to the determination result, as to which layer, one of the DVD layer and the HDDVD layer, to be reproduced in priority.

The AV processing circuit 108 processes reproducing data input from the demodulation circuit 105 and acquires picture information and sound information. The information is then output to the TV device 200 via the AV interface 109. In addition, information for outputting a predetermined screen or sound is appropriately output from the AV processing circuit 108 to the AV interface 109 according to the signal from the controller 106.

The AV interface 109 is an interface for outputting the AV data from the AV processing circuit 108 to the connected TV device 200. An interface (HD/IF) for outputting the AV data of HD mode and an interface (SD/IF) for outputting the AV data of SD mode are arranged in the AV interface 109.

The HD/IF is the interface that complies with the HDMI (High-Definition Multimedia Interface) (HDMI Licensing, registered trademark of LLC) standard. Such an interface implements a strong content protecting function. If the interface complying with such a standard is similarly arranged on the connected TV device 200 side, information can be mutually exchanged via both the interfaces.

The SD/IF is a normal AV interface that does not comply with the HDMI standard. Information cannot be exchanged with the connected TV device 200 via such an interface.

In the present embodiment, an inquiry is made to the connected TV device 200 via the HD/IF on the information regarding the monitor specification. The function of the connected TV device 200 is determined based on the presence or absence of any response to the inquiry and the content thereof if a response is made, and accordingly, which layer, one of the DVD layer and the HDDVD layer in the hybrid next generation DVD, to be reproduced in priority is set.

Figure 4:
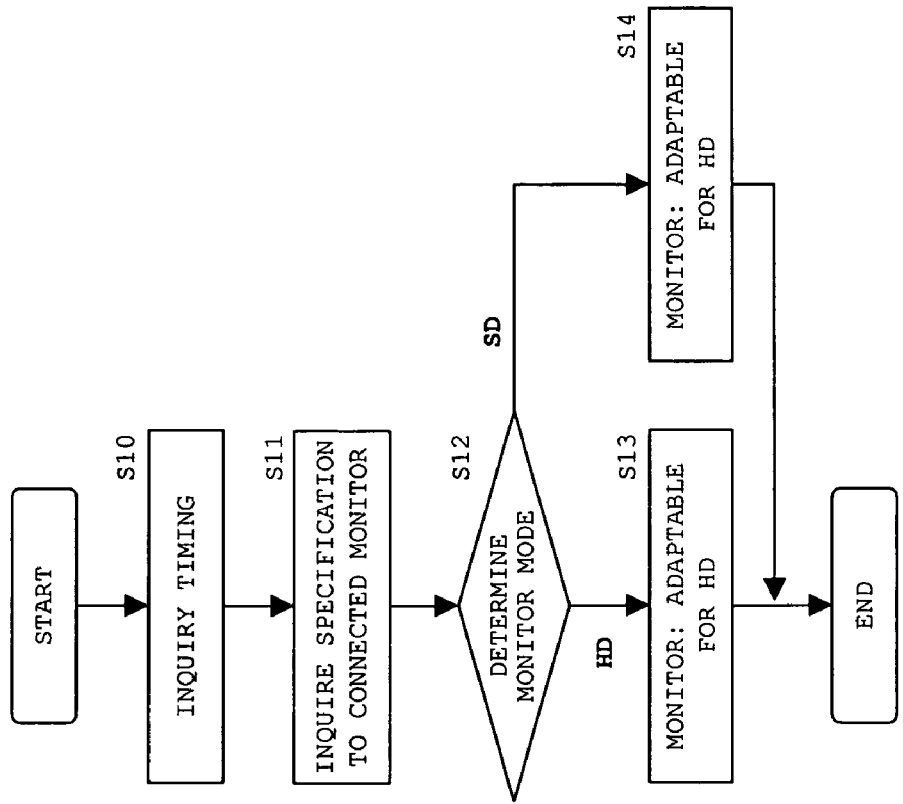
FIG. 4 is a flow chart showing a basic flow in monitor determination according to the embodiment of the present invention.
Figure 5:
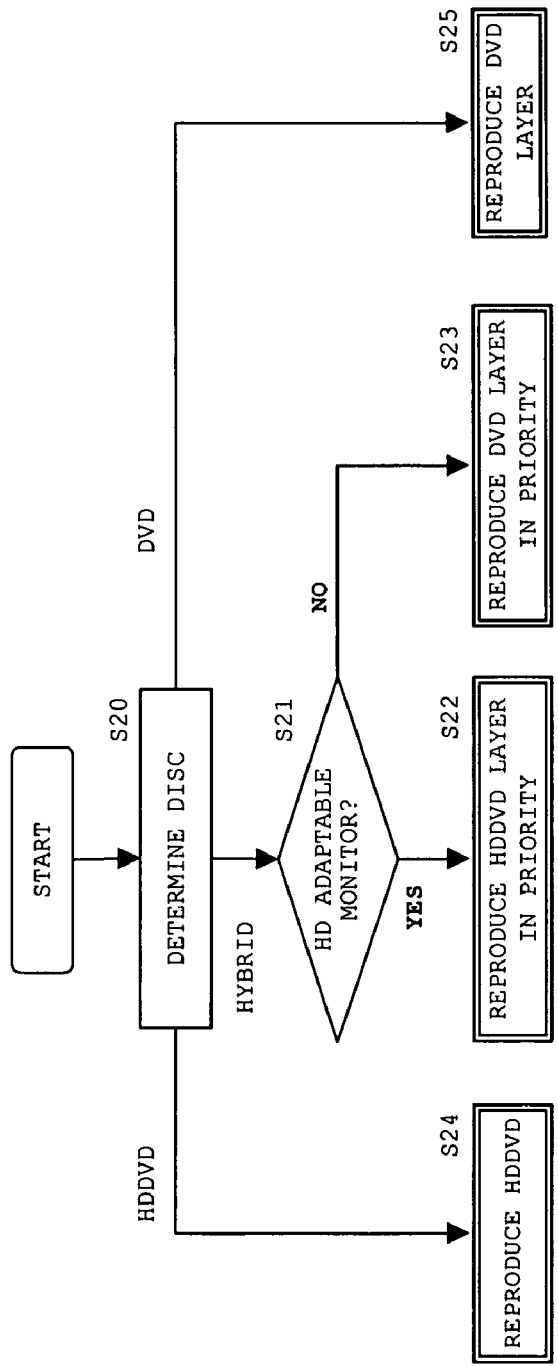
FIG. 5 is a flow chart showing a basic flow in disc reproduction according to the embodiment of the present invention.

FIG. 4 and FIG. 5 show the basic flow of the process according to the present embodiment.

With reference to FIG. 4, when inquiry timing (when the power is turned ON, at a certain time interval, and such) with respect to the TV device 200 is reached (S10), the inquiry on the information regarding the monitor specification is output from the HD/IF of the AV interface 109 (S11). If the TV device 200 is connected to the HD/IF at this point, the response to this inquiry is sent back from the TV device 200.

If the TV device 200 is not connected to the HD/IF, on the other hand, the response to this inquiry is not sent back from the TV device 200.

The controller 106 determines whether the connected TV device 200 is adaptable for the HD mode based on the presence or absence of a response to this inquiry and the content of the response (S12). That is, if the response to the inquiry is not made, the connected TV device 200 is assumed to be inadaptable for the HD mode (S14). If the response is made, the information regarding the monitor specification sent back from the connected TV device 200 is referenced, and determination on whether the TV device 200 is adaptable for the HD mode is made based thereon (S13, S14).

Thereafter, when the disc is loaded, the reproduction process shown in FIG. 5 is performed. The determining process is first performed on the loaded disc (S20). Such determination is performed using various methods. For instance, the information of each recording layer may actually be demodulated while switching the laser light and the demodulating section, and disc determination may be performed based on whether the relevant layer is demodulatable or not.

The disc determination is performed based on the S curve produced on the focus error signal shown in FIG. 2. That is, after the red laser light is lighted, focus search on the disc is performed. Determination is made on whether the disc is a single layer type or a multi-layer type based on the number of S curves produced on the focus error signal. In a case of multi-layer type, the ratio (R=PP2/PP1) between the peak interval PP1 of the largest S curve and the peak interval PP2 of the second largest S curve is calculated. If the peak ratio R is greater than or equal to a threshold value, the disc is determined as the multi-layer disc in which a plurality of DVD layers or HDDVD layers are arranged. If the peak ratio R is less than the threshold value, the disc is determined as the hybrid next generation DVD in which the DVD layer and the HDDVD layer are arranged.

When the disc is determined as the multi-layer disc in which a plurality of DVD layers or HDDVD layers are arranged, the recording layer positioned first when seen from the optical pick up side is read with the red laser light. The read signal is demodulated with the DVD decoding section of the demodulation circuit 105, and determination is made on whether or not demodulatable. If demodulatable, the disc is determined as the multi-layer disc in which a plurality of DVD layers are arranged. If not demodulatable, the disc is determined as the multi-layer disc in which a plurality of HDDVD layers are arranged. In this case, determination is made on whether or not the first recording layer is demodulatable with the blue laser light to verify that the disc is the multi layer disc in which a plurality of HDDVD layers are arranged.

When the disc is determined as the single layer type from the number of S curves produced on the focus error signal, the recording layer is read with the red laser light. The read signal is demodulated with the DVD decoding section of the demodulation circuit 105, and determination is made on whether or not demodulatable. If demodulatable, the disc is determined as the single layer disc in which one DVD layer is arranged. If not demodulatable, the disc is determined as the single layer disc in which one HDDVD layer is arranged. In this case, determination is made on whether or not the recording layer is demodulatable with the blue laser light to verify that the disc is the single layer disc in which one HDDVD layer is arranged.

If the determination result in S20 is the multilayer or single layer type DVD or HDDVD, reproduction is performed in a disc mode corresponding to the determination result.

If the determination result in S20 is the hybrid next generation DVD, determination is made on whether the connected TV device 200 is adaptable for the HD mode (S13, S14 of FIG. 4) (S21). If adaptable for the HD mode, the reproduction process prioritizing the HDDVD layer is performed (S22). If not adaptable for the HD mode, the reproduction process prioritizing the DVD layer is performed (S23).

A specific process flow according to the present embodiment will now be explained.

EXAMPLE 1

Figure 6:
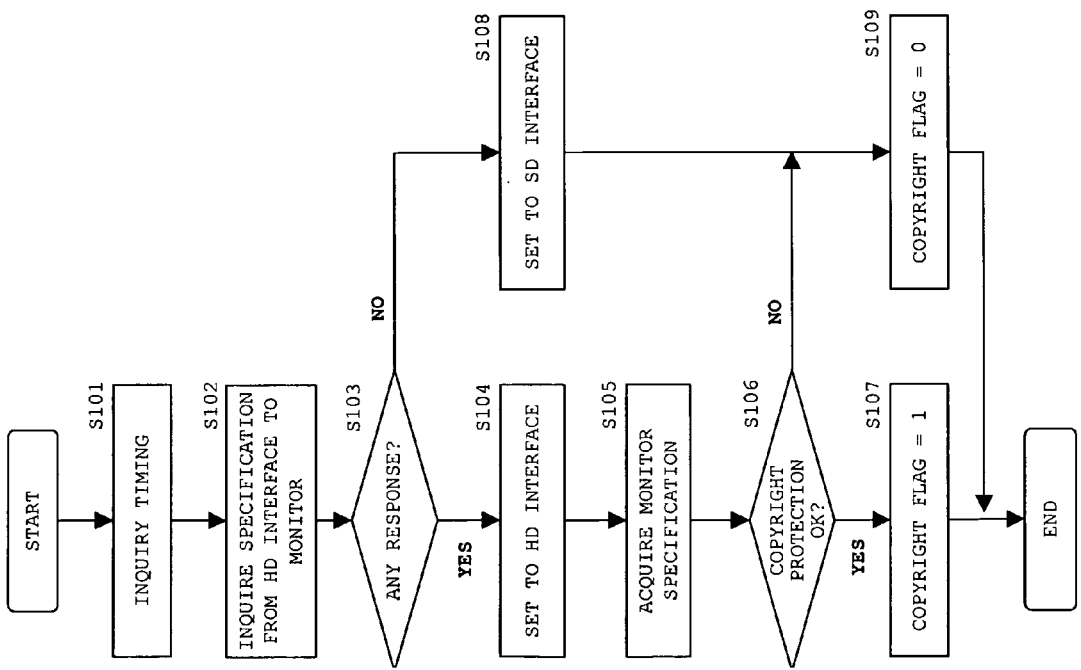
FIG. 6 is a process flow chart in monitor determination according to an example 1.
Figure 7:
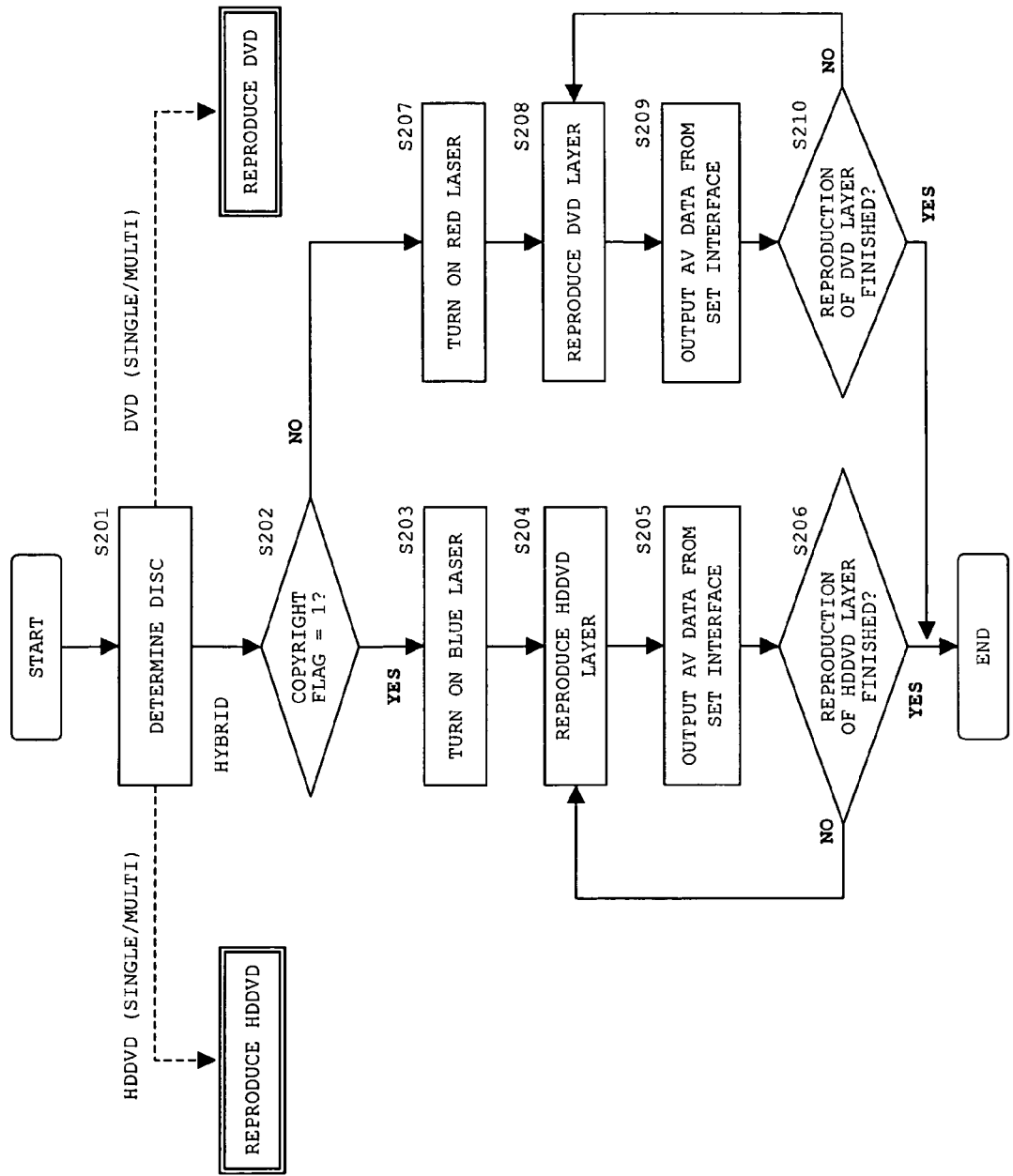
FIG. 7 is a process flow chart in disc reproduction according to the example 1.

FIG. 6 and FIG. 7 show process flows according to this example.

With reference to FIG. 6, when the inquiry timing with respect to the connected TV device 200 is reached (S101), the inquiry of the information regarding the monitor specification is output from the HD/IF in the AV interface 109 (S102). If the response is not made to the inquiry (S103: NO), the output interface in the AV interface 109 is set to SD/IF (S108), and further, a copyright flag is set to "0" (initial value) (S109). If the response is made to the inquiry (S103: YES), the output interface in the AV interface 109 is set to HD/IF (S104), and the monitor specification information acquired from the TV device 200 is stored in the memory (S105).

The monitor specification information contains information such as monitor resolution, aspect ratio, availability of a digital output terminal for video data output, and the like.

Further, determination is made on the copyright protecting function of the TV device 200 based on the acquired monitor specification information (S106). If the copyright protecting function satisfies the condition set in advance, the copyright flag is set to "1" (S107), and if the condition is not satisfied, the copyright flag is set to "0" (initial value) (S109).

Examples of the condition for whether the copyright protecting function is satisfied include whether the digital output terminal for video data output is arranged in the TV device 200. If the output terminal is arranged, the copyright protecting function of the TV device 200 is determined as insufficient, and the copyright flag is set to "0". If the output terminal is not arranged, on the other hand, the copyright protecting function of the TV device 200 is considered to satisfy the set condition, and the copyright flag is set to "1".

Determination on whether the copyright protecting function is satisfied may be made with other monitor specification information. Alternatively, since the interface complying with the HDMI (High-Definition Multimedia Interface) (HDMI Licensing, registered trademark of LLC) standard has the strong copyright protecting function, the copyright protecting function of the TV device 200 can be determined to satisfy the set condition only by the response to the inquiry from the HD/IF (S103: YES).

Thereafter, when the disc is loaded, the reproduction process shown in FIG. 7 is performed. First, the determination process on the loaded disc is performed as above (S201).

When determined as the hybrid next generation DVD in disc determination, and subsequently, a reproducing instruction is input from the user, the copyright flag set on the basis of the process flow of FIG. 6 is referenced (S202). When the copyright flag is set to "1" (S202: YES), the blue laser is lighted (S203), and the HDDVD layer is reproduced (S204). The reproduced data is then output from the interface set in the process flow of FIG. 6 to the connected TV device 200 (S205). The reproduction process is repeated until the reproduction on the HDDVD layer is finished (S206).

If the copyright flag is set to "0" (S202: NO), on the other hand, the red laser is lighted (S207), and the DVD layer is reproduced (S208). The reproduced data is then output from the interface set in the process flow of FIG. 6 to the connected TV device 200 (S209). The reproduction process is repeated until the reproduction on the DVD layer is finished (S210).

According to the present example, since the reproduction of the HDDVD layer is prioritized if the copyright protecting function of the connected TV device 200 satisfies the set condition, and the reproduction of the DVD layer is prioritized if the copyright protecting function does not satisfy the set condition, the video content can be reliably protected against leakage to the outside via the connected TV device 200 when recorded in the HD mode on the HDDVD layer.

EXAMPLE 2

In the present example, the process flow (in reproduction) of FIG. 7 of the example 1 is partially changed.

Figure 8:
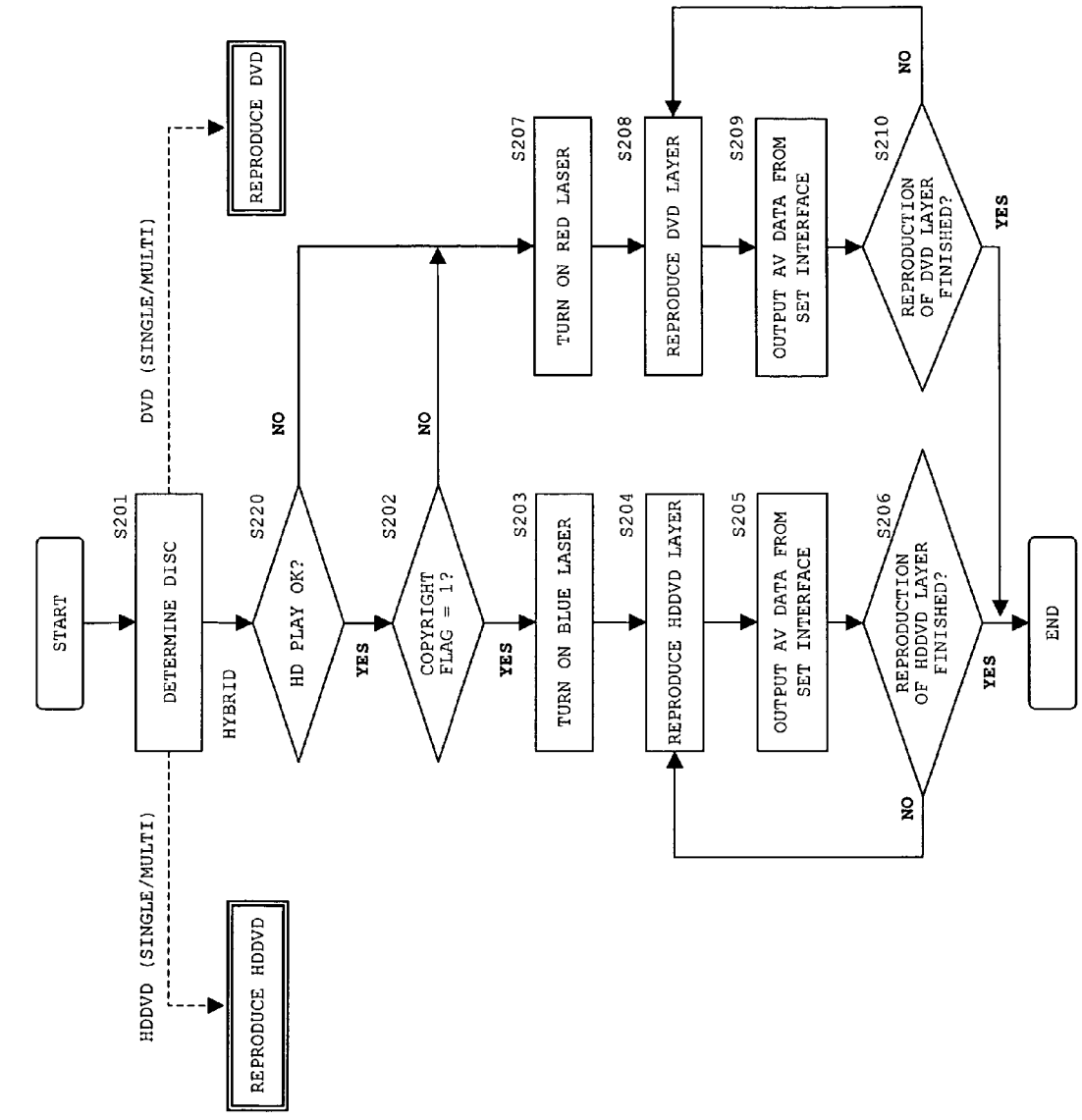
FIG. 8 is a process flow chart in disc reproduction according to an example 2.

FIG. 8 shows a process flow in reproduction according to the present example. In the present process flow, a processing step of S220 is added to the process flow of FIG. 7. The other steps are the same as in FIG. 7.

That is, when it is determined that the loaded disc is the hybrid next generation DVD in S201, determination is made on whether the connected TV device 200 is capable of displaying the video image of HD mode in S220 before the copyright flag is referenced in S202. The determination is performed by comparing with a defined value the information regarding the monitor resolution, aspect ratio or the like out of the monitor specification information acquired in the process flow of FIG. 6.

In such determination, when the display of HD mode is not possible (S220: NO), the red laser is lighted (S207), and the DVD layer is reproduced (S208). Processes similar to those of FIG. 7 are then performed.

When it is determined that the display of HD mode is possible (S220: YES), the copyright flag is referenced and determination is made on whether the copyright flag is set to "1" (S202). If the copyright flag is set to "1" (S202: YES), the process proceeds to S203, and if the copyright flag is set to "0" (S202: NO), the process proceeds to S207. Processes similar to those of FIG. 7 are then performed.

According to the present example, an advantage of avoiding unnecessary reproduction of the HDDVD layer is obtained in addition to the advantages of the example 1. That is, if the connected TV device 200 cannot display the video image of HD mode, the reproduction of the DVD layer is prioritized even if the copyright flag is set to "1". Thus, the unnecessary reproduction on the HDDVD layer is avoided, and the leakage of the video content of HD mode recorded on the HDDVD layer is further prevented.

EXAMPLE 3

In the present example, the process flow (in reproduction) of FIG. 7 in the example 1 is partially changed.

Figure 9:
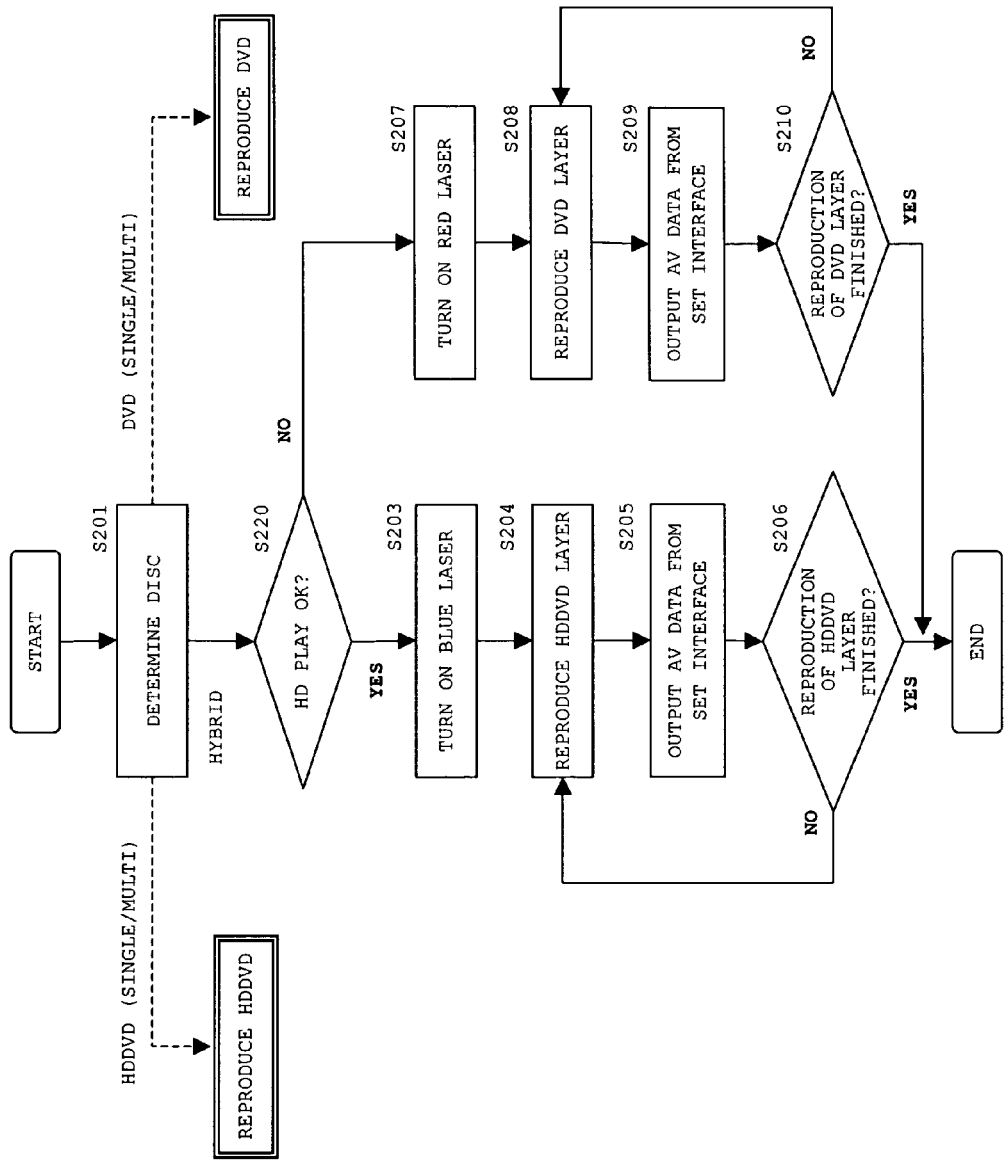
FIG. 9 is a process flow chart in disc reproduction according to an example 3.

FIG. 9 shows a process flow in reproduction according to the present example. In the present flow, the processing step of S202 in the process flow of FIG. 7 is replaced by the processing step of S220. The other steps are the same as in FIG. 7.

Whether to prioritize the HDDVD layer or the DVD layer is set based on the copyright flag in the process flow of FIG. 7, but in the present example, which layer to be prioritized is set depending on whether the connected TV device 200 is capable of displaying the video image of HD mode without referencing the copyright flag.

That is, when it is determined that the loaded disc is the hybrid next generation DVD in S201, determination is made on whether the connected TV device 200 is capable of displaying the video image of HD mode in S220. This determination is performed by comparing with the defined value the information regarding the monitor resolution, aspect ratio or the like out of the monitor specification information acquired in the process flow of FIG. 6.

In such determination, if the display of HD mode is not possible (S220: NO), the red laser is lighted (S207), and the DVD layer is reproduced (S208). Processes similar to those of FIG. 7 are then performed.

If determined that the display of HD mode is possible (S220: YES), the blue laser is lighted (S203), and the HDDVD layer is reproduced (S204). Processes similar to those of FIG. 7 are then performed.

According to the present example, an advantage of avoiding unnecessary reproduction on the HDDVD layer is obtained. That is, if the connected TV device 200 cannot display the video image of HD mode, the reproduction of the DVD layer is prioritized. Therefore, the unnecessary reproduction on the HDDVD layer is avoided, and the leakage of the video content of HD mode recorded on the HDDVD layer is prevented.

EXAMPLE 4

The present example relates to the process of, when one of the HDDVD layer and the DVD layer is prioritized, jumping to the other recording layer in accordance with an instruction from a user or application, and reproducing the other recording layer.

Figure 10:
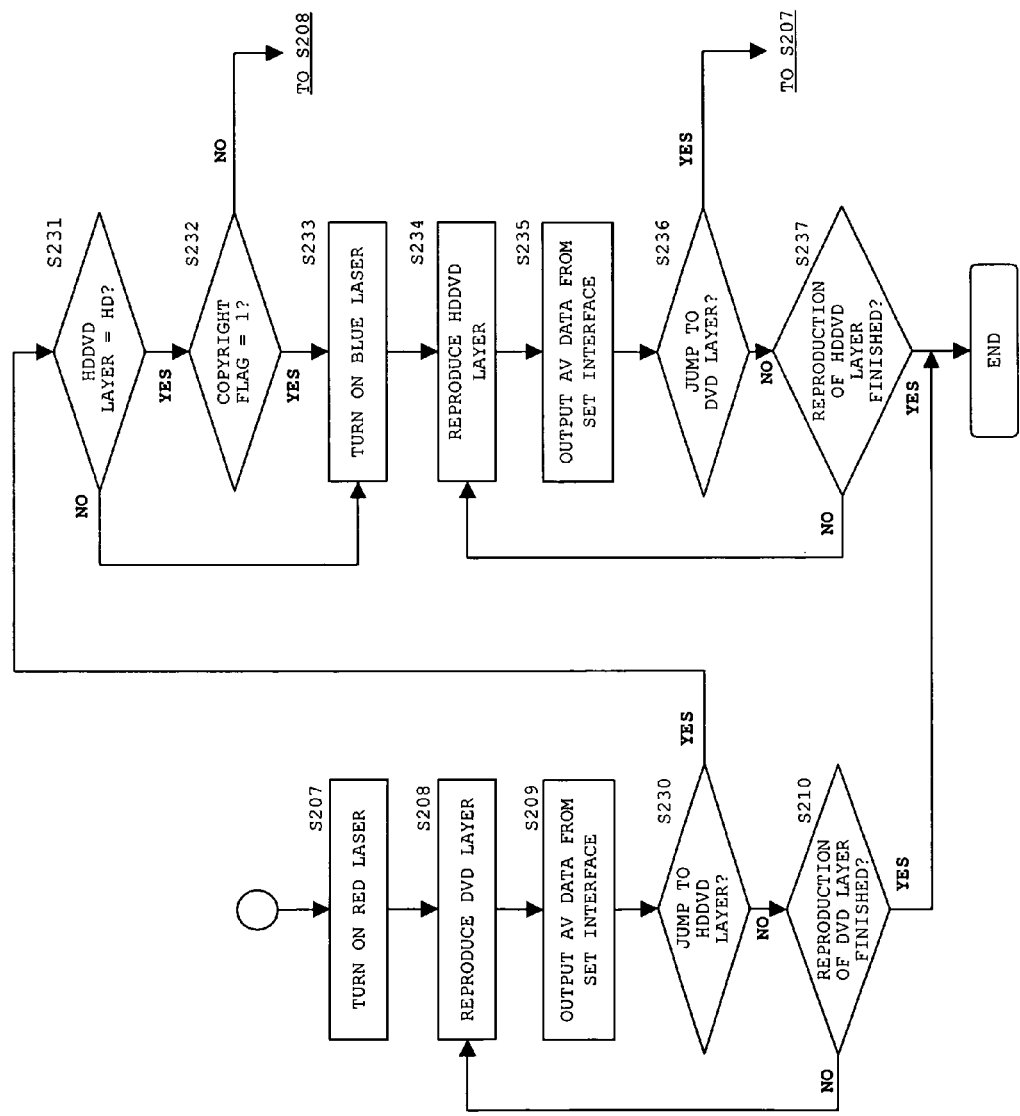
FIG. 10 is a process flow chart in disc reproduction (in jump) according to an example 4.

FIG. 10 shows a process flow after the DVD layer is prioritized in each one of the examples described above.

When reproduction on the DVD layer is prioritized based on the copyright flag or whether the display in the HD mode is possible, the red laser is lighted (S207), and the DVD layer is reproduced (S208). The reproduced data is then output from the interface set in the process flow of FIG. 6 to the connected TV device 200 (S209). As long as a jump instruction to the HDDVD layer is not made (S230: NO), this reproduction process is continued until the reproduction on the DVD layer is finished (S210).

If the jump instruction to the HDDVD layer is input to the controller 106 during the process on the DVD layer (S203: YES), determination is made on whether the video content recorded on the HDDVD layer is in the HD mode (S231).

The determination is performed by referencing the information contained in the sub-information of the HDDVD layer. The sub-information of the HDDVD layer is, for example, read in advance during the disc determination (S201) in the process flows of FIG. 7, FIG. 8, and FIG. 9. That is, in parallel with the disc determination, the sub-information in each recording layer such as lead-in information is also read and stored in the memory. The sub-information contains information for identifying whether the video content recorded on each recording layer is in the HD mode or the SD mode.

When it is determined that the video content on the HDDVD layer is not recorded in the HD mode in S231 (S231: NO), the blue laser is lighted (S233), and the jump to the HDDVD layer and the reproduction process thereon are performed (S234). The reproduced data is then output from the interface set in the process flow of FIG. 6 to the connected TV device 200 (S235). As long as the jump instruction to the DVD layer is not made (S236: NO), this reproduction process is continued until the reproduction on the HDDVD layer is finished (S237).

If the jump instruction to the DVD layer is again input to the controller 106 (S236: YES) during the process on the HDDVD layer, the red laser is lighted (S207), and the DVD layer is reproduced (S208). In this case, for example, the reproduction of the DVD layer is resumed from the position following the position at the time of the previous jump.

When it is determined that the video content on the HDDVD layer is recorded in the HD mode in S231 (S231: YES), the copyright flag is referenced (S232). If the copyright flag is "1", the blue laser is lighted (S233), and the reproduction process on the HDDVD layer is performed (S234). Similar processes are then performed.

If the copyright flag is "0", the jump to the HDDVD layer is not performed, and the reproduction of the DVD layer is continued (S208). Notification that the jump to the HDDVD layer has been prohibited may be displayed overlapping the screen of the TV device 200.

The process flow of FIG. 10 is for when the DVD layer is prioritized at the initial operation, but if the reproduction of the HDDVD layer is prioritized, a jump to the DVD layer may be appropriately executed according to the jump instruction to the DVD layer without referencing the copyright flag.

According to the present example, since the reproduction and jump to the HDDVD layer are performed only when the copyright protecting function of the connected TV device 200 satisfies the set condition, and the reproduction and jump to the HDDVD layer are prohibited when the copyright protecting function does not satisfy the set condition, the video content can be more reliably protected against leakage to the outside via the connected TV device when recorded in the HD mode on the HDDVD layer.

Various examples of the present invention have been illustrated but the embodiment of the present invention is not limited to the above examples, and various other modifications may be made.

For instance, the optical disc device that handles the hybrid optical disc including the DVD layer and the HDDVD layer has been explained in the above embodiment, but the present invention is also applicable to an optical disc device that handles a hybrid optical disc such as a Blu-ray disc in which a cover layer having a thickness of 0.1 mm is arranged on the entering side of the laser light, and a recording layer complying with the Blu-ray format is arranged behind the cover layer. In this case, the Blu-ray layer and the DVD layer are arranged at positions 0.1 mm and 0.6 mm, respectively, from the disc surface on the entering side of the laser light. In this case, strict copyright protection can be provided to the content held in the Blu-ray layer.

The present invention is not limited to the above embodiment, and the scope of the technical idea is to be interpreted by elements described in the appended claims.

What is claimed is:

1. An optical disc device capable of reproducing a hybrid optical disc in which a DVD layer and a next generation DVD layer using laser light having a wavelength shorter than a wavelength of laser light for the DVD layer are arranged in a stacking direction, the optical disc device comprising:
a determining means for determining a function of a monitor to which the optical disc device is connected; and
reproducing means for reproducing one of the DVD layer and the next generation DVD layer arranged in the hybrid optical disc in priority to the other layer based on a determination result of the determining means.

2. The optical disc device according to claim 1, wherein
the determining means determines whether the function of the connected monitor is adaptable for the reproduction of the next generation DVD layer, and
when the function of the connected monitor is adaptable for the reproduction of the next generation DVD layer, the reproducing means executes a reproduction process to the next generation DVD layer in priority to the DVD layer.

3. The optical disc device according to claim 2, wherein
the determining means determines whether a copyright protecting function of the connected monitor satisfies a condition set in advance, and
when the condition is satisfied, the reproducing means executes the reproduction process to the next generation DVD layer in priority to the DVD layer.

4. The optical disc device according to claim 3, wherein
when the copyright protecting function of the connected monitor does not satisfy the condition, the reproducing means prohibits the reproduction process from running with respect to the next generation DVD layer.

5. The optical disc device according to claim 3, wherein
the determining means includes a means for acquiring, from the connected monitor, information for evaluating the copyright protecting function.

6. The optical disc device according to claim 2, wherein
the determining means determines whether the function of the connected monitor is adaptable for a high-definition mode, and
when the function of the connected monitor is adaptable for the high-definition mode, the reproducing means executes the reproduction process to the next generation DVD layer in priority to the DVD layer.

7. The optical disc device according to claim 6, wherein
the determining means further determines whether a copyright protecting function of the connected monitor satisfies a condition set in advance, and
when the condition is further satisfied, the reproducing means executes the reproduction process to the next generation DVD layer in priority to the DVD layer.

8. The optical disc device according to claim 7, wherein
when the determining means determines that the copyright protecting function of the connected monitor satisfies the condition set in advance but is inadaptable for the high-definition mode, the reproducing means executes the reproduction process to the DVD layer in priority to the next generation DVD layer.

9. The optical disc device according to claim 8, wherein
the reproducing means executes the reproduction process to the next generation DVD layer according to a jump instruction to the next generation DVD layer.

10. The optical disc device according to claim 6, wherein
the determining means includes a means for acquiring, from the connected monitor, information for evaluating the function of the connected monitor.

11. An optical disc device capable of reproducing a hybrid optical disc in which a DVD layer and a next generation DVD layer using laser light having a wavelength shorter than a wavelength of laser light for the DVD layer are arranged in a stacking direction, the optical disc device comprising:
a determination processing section that determines a function of a monitor to which the optical disc device is connected; and
a reproduction processing section that reproduces one of the DVD layer and the next generation DVD layer arranged in the hybrid optical disc in priority to the other layer based on a determination result of the determination processing section.

12. The optical disc device according to claim 11, wherein
the determination processing section determines whether the function of the connected monitor is adaptable for the reproduction of the next generation DVD layer, and
when the function of the connected monitor is adaptable for the reproduction of the next generation DVD layer, the reproduction processing section executes the reproduction process to the next generation DVD layer in priority to the DVD layer.

13. The optical disc device according to claim 12, wherein
the determination processing section determines whether a copyright protecting function of the connected monitor satisfies a condition set in advance, and
when the condition is satisfied, the reproduction processing section executes the reproduction process to the next generation DVD layer in priority to the DVD layer.

14. The optical disc device according to claim 13, wherein
when the copyright protecting function of the connected monitor does not satisfy the condition, the reproduction processing section prohibits the reproduction process from running with respect to the next generation DVD layer.

15. The optical disc device according to claim 13, wherein
the determination processing section executes a process for acquiring, from the connected monitor, information for evaluating the copyright protecting function.

16. The optical disc device according to claim 12, wherein
the determination processing section determines whether the function of the connected monitor is adaptable for a high-definition mode, and
when the function of the connected monitor is adaptable for the high-definition mode, the reproduction processing section executes the reproduction process to the next generation DVD layer in priority to the DVD layer.

17. The optical disc device according to claim 16, wherein
the determination processing section further determines whether a copyright protecting function of the connected monitor satisfies a condition set in advance, and
when the condition is further satisfied, the reproduction processing section executes the reproduction process to the next generation DVD layer in priority to the DVD layer.

18. The optical disc device according to claim 17, wherein
when the determination processing section determines that the copyright protecting function of the connected monitor satisfies the condition set in advance but is inadaptable for the high-definition mode, the reproduction processing section executes the reproduction process to the DVD layer in priority to the next generation DVD layer.

19. The optical disc device according to claim 18, wherein
the reproduction processing section executes the reproduction process to the next generation DVD layer according to a jump instruction to the next generation DVD layer.

20. The optical disc device according to claim 16, wherein
the determination processing section includes a means for acquiring, from the connected monitor, information for evaluating the function of the connected monitor.

* * * * *